UNITED STATES PATENT OFFICE.

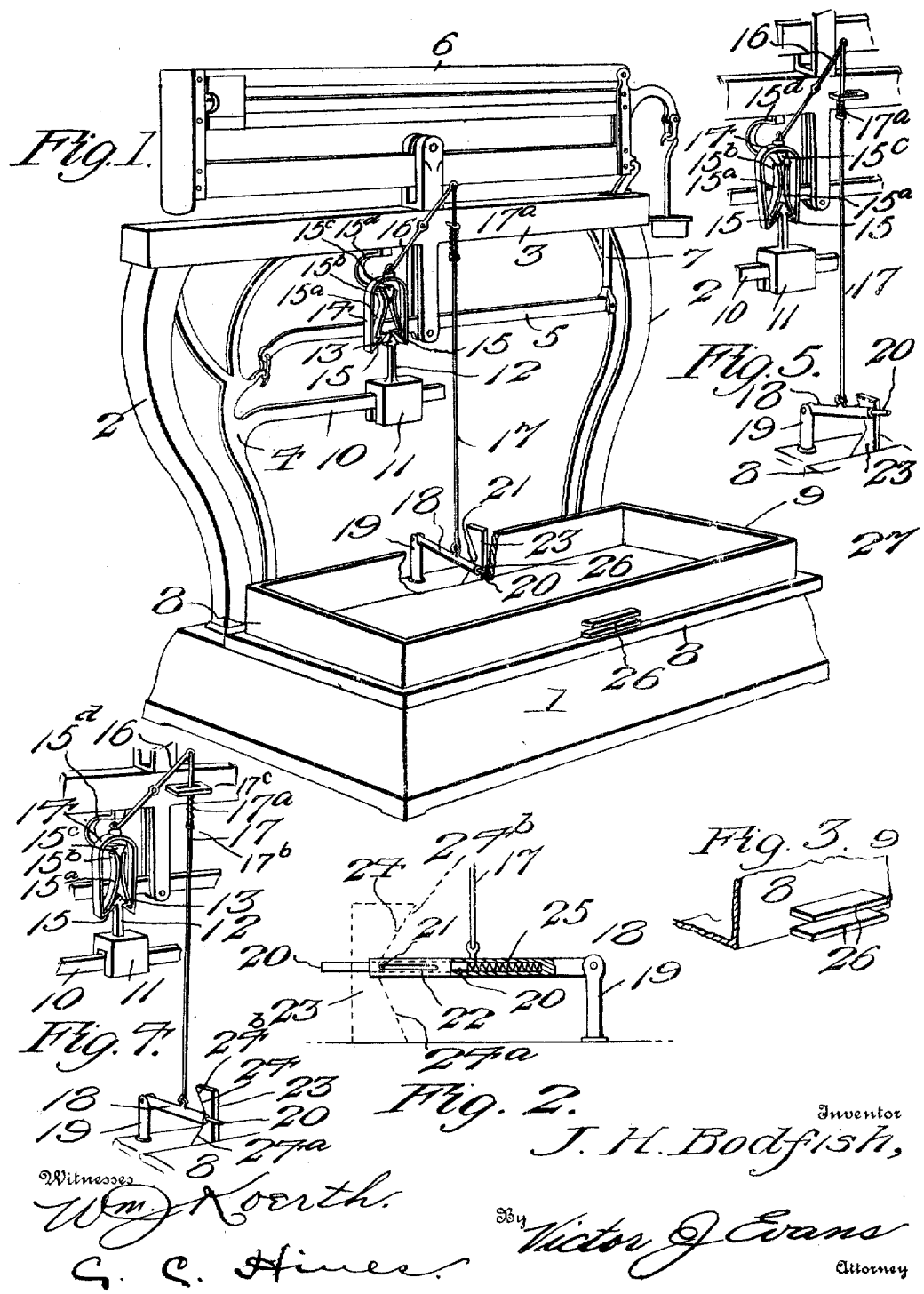

JOHN H. BODFISH, OF NORTH BRADLEY, MICHIGAN.

SCALE.

No. 828,806.     Specification of Letters Patent.     Patented Aug. 14, 1906.

Application filed October 24, 1905. Serial No. 284,213.

*To all whom it may concern:*

Be it known that I, JOHN H. BODFISH, a citizen of the United States of America, residing at North Bradley, in the county of Midland and State of Michigan, have invented new and useful Improvements in Scales, of which the following is a specification.

This invention relates to improvements in scales, and particularly to computing-scales, and has for its object to provide simple and effective means to automatically add to the weighing mechanism a counterweight equivalent to the weight of the scoop when the latter is applied for use and to relieve the mechanism of such added weight when the scoop is removed.

The invention further has for its object to provide a construction whereby the compensating weight will be automatically thrown into and out of action by means controlled directly by the scoop itself.

The invention obviates the necessity of throwing a compensating weight or resistance into and out of action by hand, and thus reduces labor and adds to the convenience of the scale.

In the accompanying drawings, Figure 1 is a perspective view of a computing-scale embodying my invention, showing the parts in the position they assume when the scoop is applied. Fig. 2 is a detail side elevation, partly in section, of the actuating trip-lever, the stop appearing in dotted lines. Fig. 3 is a fragmentary view of the scoop. Figs. 4 and 5 are detail views showing in connection with Fig. 1 the different operative positions of the parts.

Referring now more particularly to the drawings, 1 represents the base, 2 the standards, and 3 the upper stationary portion, of the frame of the scale.

4 is a movable part of the scale mechanism to which the tare-beam 5 is attached at one end, the other end of said beam being connected to the main scale-beam 6 by the usual link 7.

8 denotes the scale-platform, and 9 the scoop, which may be of any preferred form.

In accordance with my invention the movable part 4 of the scale mechanism is provided with a supporting arm or rest 10 for a compensating resistance-weight 11, which corresponds in weight with the scoop 9 and is slotted to slide vertically on the arm 10 within the limit of its prescribed movements without disconnection therefrom. This resistance-weight is provided with an upwardly-extending shank 12, terminating at its free end in a beveled or arrow-shaped head 13. Coöperating with said shank is a weight-controlling device 14, said device being substantially in the form of a spring-metal bail, the arms of which are bent inward and upward at their lower ends to form bevel-faced jaws 15, adapted to engage the head 13 of the shank. The jaws are adapted to normally close under the action of the spring-arms, and to said jaws are connected the lower ends of arms 15$^a$, having diverging or flared upper free ends 15$^b$ to coöperate with a wedge-shaped jaw-spreader 15$^c$, carried by a bracket 15$^d$, fixed to the frame portion 3.

The weight-controlling device 14 is connected to one arm of a lever 16, pivoted intermediately to the upper stationary frame portion 3 and attached by its other arm through the medium of a rod or link 17 with an actuating device 18, mounted upon the base of the scale. A spring 17$^a$ surrounds the rod 17 between a head 17$^b$ thereon and a guide 17$^c$ on the frame portion 3 and forces said rod downward.

The actuating device 18 is pivoted at its outer or rear end to a short post or standard 19, rising from the rear portion of the base 1, and projects forwardly therefrom, with its free end terminating above the rear edge of the platform 8. The actuating device is made tubular or chambered to receive a reciprocating plunger 20, provided with a stop-pin 21, slidable in a slot 22, formed in the side of the actuating device and projecting laterally therefrom to engage a stop-plate 23, fixed to the base adjacent thereto. This pin engages the V-shaped rear edge 24 of the plate 23 to limit the up-and-down swinging movement of said actuating device, pin 21 sliding in the slot 22 to permit the device to swing in the arc of a circle and to properly compensate therefor. A coiled spring 25 is disposed in the member 18 and serves to project the plunger and pin outward and hold the latter in contact with the stationary stop-plate.

Fig. 1 of the drawings illustrates the positions of the parts when the scoop 9 is applied for use, from which it will be seen that the forward end of the lever 18 is depressed and the jaws 15 of the weight-controlling device released from engagement with the head 13, thus allowing the weight 11 to seat upon the arm 10. The lever 18 is adapted to be controlled in action by the scoop, and to this end the scoop is provided upon each side thereof with spaced engaging projections 26 to project above and below the free end of the plunger 20, such arrangement of said projections adapting the scoop to be applied with either side thereof facing the actuating-lever.

Normally or when the scoop 9 is removed from the platform 8 the pin 21 engages the stop-plate 23 between inclined portions 24ª and 24ᵇ thereof, and the jaws 15 are in engagement with the head 13 of the weight 11 and hold said weight slightly suspended above the arm 10, as shown in Figs. 2 and 4, said weight being counterbalanced and supported by the action of the spring 17ª and stop-pin 21. When the scoop is applied, the engaging devices 26 on the side of the scoop facing the post 19 engage above and below the plunger 20, and upon the seating of the scoop on the platform 8 the lever 18 will be depressed from the position shown in Figs. 2 and 4 to the position shown in Fig. 1, thereby drawing down upon the rod 17 to swing the weight-controlling device 18 upward, thus causing the arms 15ª to be spread apart by the wedge 15ᶜ, whereby the jaws 15 will also be spread apart and permit the weight 11 to drop down upon the arm 10. When the scoop is removed, it is lifted up from engagement with the platform 8 in order to release the engaging devices 26 from the plunger 20, and this action swings the lever 18 upward until the pin 21 rides up on the inclined edge 24ᵇ of the stop-plate 23, as shown in Fig. 5, whereby the bail 14 will be forced downward to snap the jaws 15 into engagement with the head 13. Then upon the removal of the scoop the spring 17ª will force the rod 17 downward until the lever 18 again assumes a horizontal position, as shown in Figs. 2 and 4, the bail 14 being thereby swung upward to lift the weight 11 off the bar 10. It will thus be seen that when the scoop is applied the weight 11 will be automatically shifted from the frame to the weighing mechanism and that upon the removal of the scoop the weight will be shifted from the weighing mechanism and supported by the parts of the device applied to the scale-frame.

Having thus described the invention, what is claimed as new is—

1. In a scale, the combination with the frame and weighing mechanism, the latter having a supporting-arm, of a scoop-compensating weight adapted to engage said arm, a lever controlled in action by the scoop, a weight lifting and removing device operatively connected with the lever and normally engaging and holding the weight out of connection with the arm, means for releasing the weight when the scoop is applied, and means for restoring the parts to normal position when the scoop is removed.

2. In a scale, the combination with a frame and weighing mechanism, of a scoop-compensating weight, a weight-controlling device having spring-jaws to engage and normally hold the weight out of engagement with the weighing mechanism, an operating-lever controlled in action by the scoop, operative connections between said lever and the weight-controlling device, said connections normally holding the device partly elevated with its jaws engaging and maintaining the weight out of connection with the weighing mechanism, a scoop having means to engage and depress the lever upon its application and elevate it upon its removal, means for releasing the spring-jaws from engagement with the weight when the lever is depressed, and means for again bringing the jaws into engagement with the weight and moving the weight out of active connection with the weighing mechanism when the scoop is removed.

3. In a scale, the combination with a frame and weighing mechanism, of a scoop-compensating weight adapted to be supported by the weighing mechanism, an operating device controlled in action by the scoop, a weight-shifting device normally holding the weight out of connection with the weighing mechanism and connected with said operating device, and means coacting with the parts to cause the weight-shifting device to transfer the weight to the weighing mechanism when the scoop is applied and for causing it to remove the weight therefrom and to restore the parts to normal position when the scoop is removed.

4. In a scale, the combination with a frame and weighing mechanism, said weighing mechanism being provided with a supporting-arm, of a scoop-compensating weight adapted to rest upon said arm, a pivotally-mounted weight-shifting device normally engaging the weight and holding it out of contact with the arm, said device being provided with jaws to grip the weight, and means operative upon the application of the scoop to swing the shifting device in one direction and retract said jaws to release the weight so that it will move into engagement with the arm and upon the removal of the scoop to throw the jaws into engagement with the weight and restore the same to normal position.

5. In a scale, the combination with a frame and weighing mechanism, the latter being provided with a supporting-arm, of a scoop-compensating weight adapted to be supported by said arm, a pivotally-mounted weight-shifting device having jaws to engage the weight, and adapted to normally hold the weight out of contact with the arm, an operating device for swinging said weight-shifting device in reverse directions, means for spreading the jaws of the weight-shifting device in its movement in one direction, and a scoop provided with means to engage the operating device and adapted in its application and removal to impart reverse movements thereto to effect the transfer of the weight to and from the arm.

6. In a scale, the combination of a frame and weighing mechanism, the latter provided with a supporting-arm, of a scoop-compensating weight adapted to engage said arm, a weight-shifting device provided with spring-actuated jaws, said jaws being normally in engagement with the weight and holding it out of engagement with the arm, a spreader for retracting the jaws when the weight-shifting device is elevated to effect the release of the weight and its transferal to the arm, and operating mechanism controlled by the scoop for swinging said weight-shifting device in reverse directions.

7. In a scale, the combination with a frame and weighing mechanism, the latter being provided with a supporting-arm, of a scoop-compensating weight adapted to rest upon said arm, a swinging weight-shifting device having jaws to engage the weight, said jaws being normally in engagement with the weight to hold it off the arm, means operative to retract said jaws when said device is moved in one direction to release the weight and permit it to move into engagement with the arm, a lever operatively connected with the weight-shifting device to swing it in one direction or the other upon the application and removal of the scoop, the scoop having means to engage and effect the operation of said lever, stop mechanism for limiting the movements of the lever, and a spring for restoring the parts to normal position.

In testimony whereof I affix my signature in presence of two witnesses.

JOHN H. BODFISH.

Witnesses:
OTIS H. WHITEHEAD,
METTA C. BODFISH.